United States Patent [19]
Prince et al.

[11] Patent Number: 5,734,656
[45] Date of Patent: Mar. 31, 1998

[54] METHOD AND APPARATUS FOR DYNAMICALLY ALLOCATING BANDWIDTH ON A TDM BUS

[75] Inventors: Jeff Prince, Sunnyvale; Mike Noll, San Jose, both of Calif.

[73] Assignee: Bay Networks, Inc., Santa Clara, Calif.

[21] Appl. No.: 537,144

[22] Filed: Sep. 29, 1995

Related U.S. Application Data

[63] Continuation of Ser. No. 501,476, Jul. 12, 1995, abandoned.
[51] Int. Cl.$^6$ ............................................. H04L 12/28
[52] U.S. Cl. ........................... 370/401; 370/395; 370/362
[58] Field of Search ................................. 370/362, 398, 370/399, 400, 401, 402, 404, 423, 434, 439, 458, 468, 452, 455, 466, 395, 397

[56] References Cited

U.S. PATENT DOCUMENTS

| | | | |
|---|---|---|---|
| 4,797,881 | 1/1989 | Ben-Artzi | 370/402 |
| 4,998,244 | 3/1991 | Lee | 370/439 |
| 5,319,644 | 6/1994 | Liang | 370/452 |
| 5,396,494 | 3/1995 | Roposh | 370/439 |
| 5,490,252 | 2/1996 | Macera et al. | 370/468 |
| 5,491,694 | 2/1996 | Oliver et al. | 370/455 |

*Primary Examiner*—Wellington Chin
*Assistant Examiner*—Soon-Dong Hyun
*Attorney, Agent, or Firm*—Blakely, Sokoloff, Taylor & Zafman, LLP

[57] ABSTRACT

The present invention relates to methods and apparatus providing for a switching hub in which an asynchronous transfer mode (ATM) switch is utilized as a backplane bus. Bus arbitration, i.e., allocation of bandwidth, on the bus for autonomous ATM and LAN switching modules coupled thereto is dynamically controlled according to the needs of the various modules. In particular, the present invention allows time division multiplexing of the bus under programmatic control such that each module, e.g., an Ethernet or Token Ring module, is allowed a desired number of cell slots on the bus during which to transfer data, which the module has translated into ATM cells, across the bus.

5 Claims, 6 Drawing Sheets

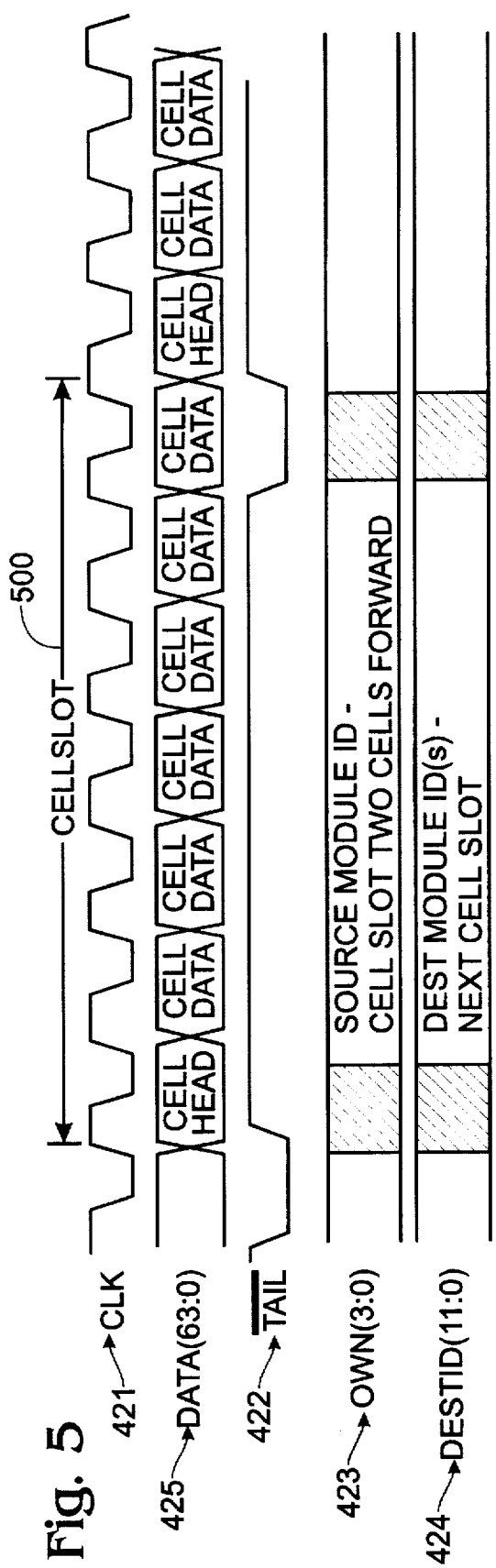
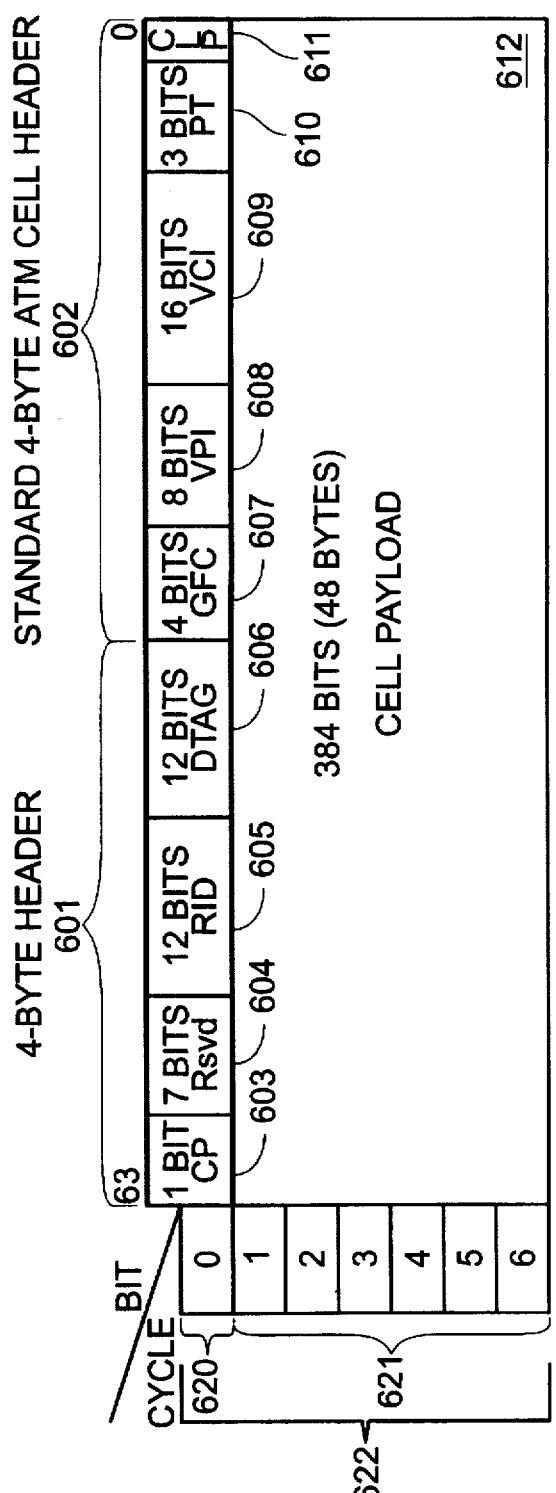
Fig. 5
Fig. 6

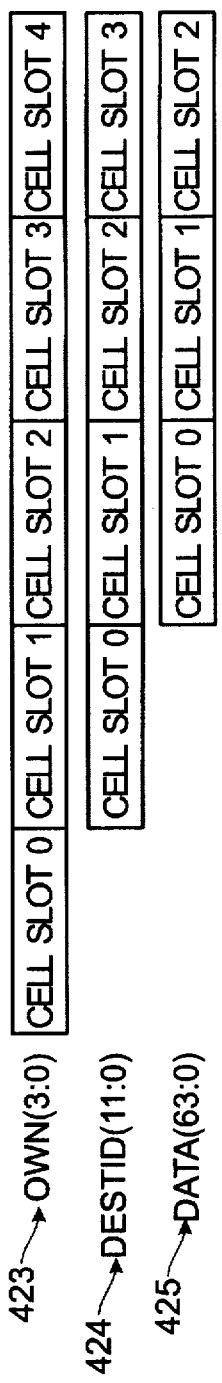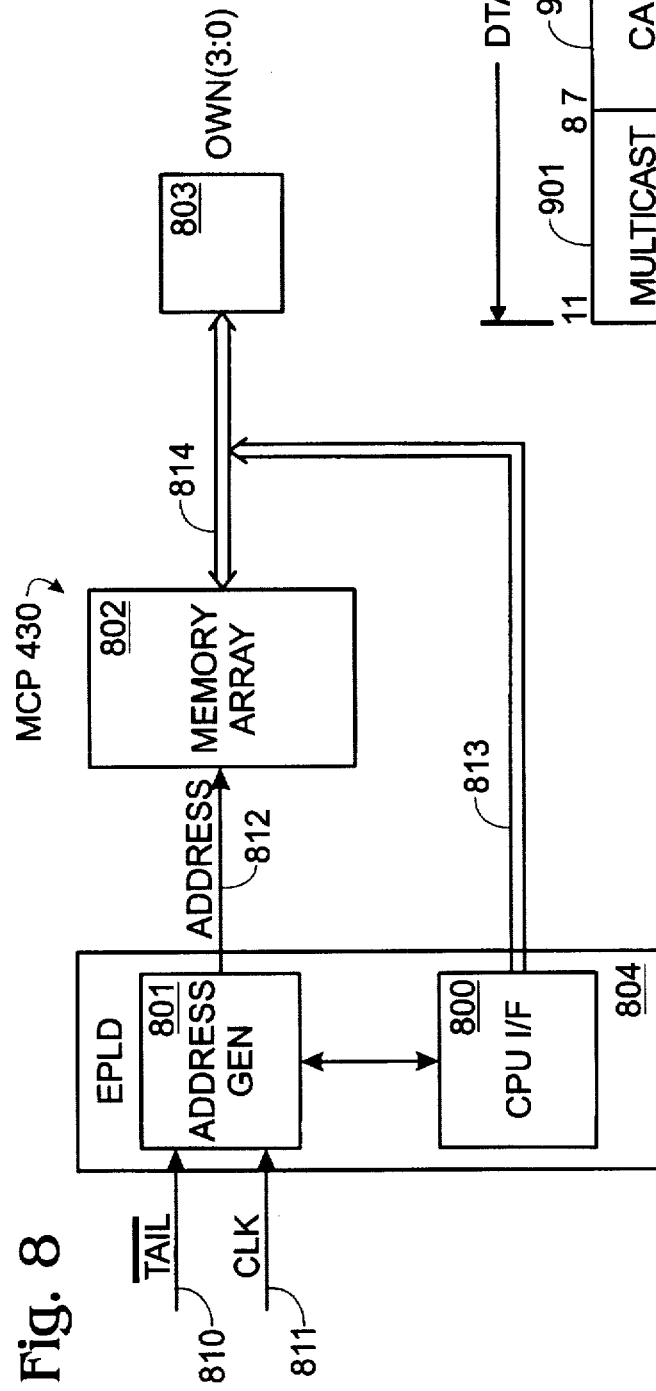

METHOD AND APPARATUS FOR DYNAMICALLY ALLOCATING BANDWIDTH ON A TDM BUS

This application is a continuation application under 37 C.F.R. §1.53 of non-provisional application Ser. No. 08/501, 476, filed on Jul. 12, 1995, entitled METHOD AND APPARATUS FOR DYNAMICALLY ALLOCATING BANDWIDTH ON A TDM BUS, now abandoned.

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of computer networking, specifically to the field of hub-based data communications in a private Asynchronous Transfer Mode (ATM) network. More specifically, the present invention relates to a method and apparatus for transmitting ATM cells through a private Asynchronous Transfer Mode (ATM) switch.

2. Description of the Related Art

The present invention relates to the field of ATM and similar networking systems. Such systems are characterized by high speed switches which act to switch data cells of a fixed size and format through the network. Below is provided a general description of ATM networks. The present invention further relates to the field to the field of communication systems employing a centralized concentrator or hub that allows the interconnection of network devices and networks in a star configuration, or topology. Further, the present invention relates to a number of methods and apparatus for improving the efficiency and predictability of allocating and using bandwidth across the ATM core fabric of an ATM switch.

OVERVIEW OF COMMUNICATIONS NETWORKS

ATM networks communicate using data cells, or simply, cells, which are relatively short, fixed length packets of data that can carry data, voice and video across networks at high speed relative to the speed of traditional data networks such as Ethernet, Token ring and even fiber distributed data interface (FDDI) networks.

Traditional LANs operate over shared media. All network devices on a particular network segment must share the media with each other, so that each device is provided with only a fraction of the total bandwidth of the media. Later generation intelligent hubs support multiple segments of different types of LANs across their backplanes to permit LANs to be segmented so that each network device is provided with greater bandwidth. Furthermore, such hubs provide for a dedicated LAN interface so that, for example, in the case of an Ethernet LAN, a single network device is provided with the full 10 Mb/s bandwidth of the LAN segment. Each port on the hub is connected internally within the hub, typically by either a common high speed bus or a cross connect.

Such hubs may be known as switching hubs. Generally, a switching hub acts to concentrate wiring for a communications network in a central location such as a facilities telephone wiring closet. The hub comprises a cabinet having multiple, in one embodiment, multiple ports where each port supports one local area network segment. Each local area network may support multiple network devices such as end user systems which may communicate over the local area network. In many such hubs, individual modules are plugged into the cabinet and each module comprises multiple ports, e.g., 16 ports per module is common in the current state of the art. The modules are interconnected so that data packets from a network device connected to a LAN segment coupled to a port on a module may be communicated to another network device connected to a LAN segment coupled to a port on another module over the bus.

Such a hub architecture is limited in that they cannot scale to the high bandwidths required for integrated networks transmitting in real time voice, video and data communications. ATM networks, however, are capable of providing the bandwidth required for such applications, both in local area networks and wide area network (WAN), whether they be small private or large public communications networks. ATM networks are capable of transmitting integrated voice, video and data traffic because, as referred to above, ATM uses small fixed size cells, each 53 bytes. By transmitting small fixed size cells, ATM overcome delays associated with transmitting relatively large, variable length packets as experienced in traditional data networks.

An embodiment of the present invention proposes utilizing an ATM switch as a routing backplane or packet switching core in a switching hub interconnecting traditional data communications network such as a local area network employing the well known carrier sense multiple access with collision detection (CSMA/CD), token ring, and fiber distributed data interface (FDDI) standards.

ATM employs a connection-oriented method of communication, unlike traditional local area network communication methods which are connectionless-oriented. Thus, prior to transferring data between two devices in an ATM network, a connection must be established between the devices. After establishing a point-to-point connection between two devices, each cell transmitted therebetween contains a standard set of fields, specifically, a virtual path identifier (VPI) and a virtual circuit identifier (VCI) that together identify the connection to which the cell belongs.

ATM NETWORK ARCHITECTURE

Standards have been adopted for ATM networks, for example, by the International Telegraph and Telephone Consultative Committee (CCITT). The ATM Forum, a group of telecommunications and data networking companies formed to ensure the interoperability of public and private ATM implementations by facilitating, clarifying, and adopting ATM standards.

The ATM standards are defined with respect to a User-to-Network Interface (UNI) and a Network-to-Network Interface (NNI). Thus, UNI refers to an interface between a network device such as and end user system and an ATM switch, whereas NNI refers to an ATM switch to ATM switch interface. An embodiment of the present invention complies with the latest CCITT ATM Layer Specification as well as the latest ATM Forum UNI specification (version 3.3). In the case of UNI, the primary form of signaling involves setting up a virtual circuit for a particular data transfer between end user systems, as facilitated by the aforementioned VPI/VCI pair. An end user system can request a connection to another end user system by transmitting a signaling request across the UNI to the network. The request is passed across the network to the destination end user system. If the end user system agrees to the request to form a connection, a mapping is defined between the VPI/VCI on both UNI. However, as will be seen, the present invention provides for an ATM switch in which, under certain circumstances, a VPI/VCI connection need not be established when communicating between network devices each attached to a port on separate modules in the ATM switch.

When a virtual circuit is established between two network devices, information is transmitted therebetween by each device sending ATM cells across their local UNI. Each cell contains the VPI/VCI assigned to that virtual circuit (VC) on each UNI. The network devices may, indeed, have multiple VCs assigned across the UNI, and can interleave cells for each circuit, so long as data for a particular VC is transmitted in order. From the perspective of an ATM switch, it has to identify, on the basis of the VPI/VCI, to what port on what module a cell received from another port on the same or another module needs to be forwarded to, and if the output port is an ATM interface, to what value should the VPI/VCI be changed to before transmitting the cell to another ATM switch.

In an ATM switch, information is actually transmitted through the switch in fixed length through virtual paths/virtual channels which are set up to facilitate such communications. The virtual paths may comprise a plurality of virtual channels. The use of virtual channels/virtual paths allows a large number of connections to be supported on a single physical communications link. In the art, virtual path/virtual channels are generally thought to be allocated during set up of a communication transmission between two network devices, e.g., between two end user systems, and torn down after the communication has completed. For example, in an ATM network implemented to support telephone communications, virtual channels may be set up along the communications link between the caller and the called party at the time the call is placed and then torn down when the telephone conversation ends. The process of setting up and tearing down a virtual path and/or virtual channel generally involves updating translation tables stored in the switch fabric of each switch involved with each virtual path/virtual channel link of the virtual path or virtual channel.

As will be seen in the present invention, only when transmitting ATM cells out an ATM port are permanent virtual circuits (PVCs) created. Otherwise, communication between ports on different modules, i.e., cross module traffic transported across the ATM switch fabric, is facilitated using a routing tag and reassembly identifier—it is not necessary to establish a permanent virtual circuit.

ATM CELL FORMAT

As previously referred to, in an ATM network, generally all information to be transferred is placed in into fixed-sized slots which are commonly referred to as cells. Of course, such fixed-sized slots may be referred to with other terminology, for example, packets. An standard ATM cell is generally shown in FIG. 1(a) and includes a 5-byte header field 101 and a 48-byte information field 102. The information field is defined to be available to the user and the header field is defined to carry information pertaining to ATM functionality, in particular, information for identification of the cells by means of a label.

The standardized format for the header field 101 is better shown in FIG. 1(b) and FIG. 1(c). The header field 101 comprises two fields: (1) a virtual channel identifier (VCI) and, (2) a virtual path identifier (VPI). The VPI field is defined as an eight-bit field in one format (UNI), e.g., FIG. 1(b), and as a twelve-bit field in another format (NNI), e.g., FIG. 1(c) and is defined to be used for routing the cell. The VCI field is also used for routing in the defined format and is defined as a sixteen-bit field. Thus, in the case of UNI, the VPI/VCI pair comprise 24 bits of the ATM cell header. As can be appreciated, header functionality has been kept to a minimum by the ATM standard in order to provide for fast processing in the network. The main functions of the header are identification of the virtual connection and certain maintenance functions. By keeping these functions to a minimum, header processing in ATM network devices is simple and can be accomplished at very high speed.

As will be seen below, in the ATM Forum UNI specification, in order to facilitate the design and lower the cost of ATM equipment, implementations are not required to support the entire VCI space, but recognize only a contiguous subset of the VCI values, such as makes sense in an embodiment of the present invention wherein a hub employing an ATM switching fabric need not support the relatively large numbers of connections as one might require in a public telecommunications network.

ATM PROTOCOL LAYERS

The ATM protocol reference model is similar to the well-known OSI reference model in that communication functionality is separated into layers. The ATM reference model is comprised of the Physical Layer, the ATM Layer (ATM) and the ATM Adaptation Layer (AAL). In order to facilitate a better understanding of the present invention, the latter two layers will be briefly discussed. The ATM layer transmits cells in an ATM switch or identifies cells belonging to a virtual circuit and passing them onto the AAL layer in an end system. The ATM layer also exchanges a stream of cells with the physical layer below. The AAL layer generates ATM cell "payloads" from the data passed to it by higher application layers using the ATM network, i.e., it is responsible for segmenting and reassembling all classes of data packets into/from the 48 bytes of information that are encapsulated at the ATM layer with the ATM cell 5-byte header.

With respect to an ATM switch, upon receipt of an ATM cell on an input port, the ATM layer determines from the VPI/VCI values the output port to which the cell should be relayed and what the new VPI/VCI values should be. It then forwards the cell to the output port, changes the VPI/VCI values, and passes the cell down to the physical layer of the output port for transmission.

The AAL layer generates the traffic that is transmitted in ATM cells. They take traffic to be sent across an ATM network, establish the connection, then package the traffic received from higher layers into 48-byte information payloads which are then passed down to the ATM layer for transmission. Conversely, the AAL layer receives information payloads passed up from the ATM layer and packages them according to the requirements for the higher layers.

There are a number of classes of service that the AAL layer provides for higher layers. With respect to an embodiment of the present invention, class 5 service is used. Class 5 service is comprised of two sublayers, a convergence sublayer (CS sublayer), the higher sublayer, and a segmentation and reassembly sublayer (SAR sublayer), the lower sublayer interfacing with the ATM layer. The CS sublayer receives variable length data packets from an upper layer, and packages them into a CS packet in which the information payload is padded to ensure it is a multiple of 48 bytes in length. This CS packet is then passed down from the CS sublayer to the SAR sublayer, where it is segmented into 48 byte information payloads. This 48 byte information payload is then passed down to the ATM layer with no SAR headers or trailers, and, thus, is relatively easy to implement. The SAR layer does not need to generate a length field since the ATM cells are 48 byte aligned. However, the SAR layer, upon receiving a series of ATM cells from the ATM layer needs to detect the beginning and end of a CS packet so that is can reassemble the ATM cells prior to passing the information payload up to a higher layer. This is facilitated by the PTI field of the ATM cell header. This is accomplished by setting the PTI field to zero for all but the last ATM cell of a CS packet.

The AAL-5 class of traffic lacks a multiplexing identifier field such as can be found in other AAL classes, e.g., AAL class 3/4. Thus, as will be seen in an embodiment of the present invention, a virtual circuit is single threaded, i.e., only ATM cells belonging to one CS packet may be transmitted over a virtual circuit until such CS packet has been completely transmitted. If more than one ATM cell from different CS packets were transmitted concurrently, the receiving ATM switch would not be able to distinguish between the ATM cells, thereby corrupting both CS packets.

ATM SWITCH ARCHITECTURE

ATM switches transmit information in fixed sized cells which comprise a well defined and size limited header area and user information area. ATM switches may utilize a variety of switching architectures including, for example, a matrix switching architecture, a backplane bus architecture, as preferred by the present invention, or other architectures, as will be mentioned briefly below. It is noted that the preferred embodiment of the present invention utilizes a backplane bus switching architecture for its ATM switch; however, it is thought that many of the teachings of the present invention have equal application to various other architectures mentioned herein.

An advantage of backplane-based ATM switch is that it can be easily integrated with current networking devices such as switching hubs which are backplane based. This allows for economical designs, where multiple modules share the bandwidth of a high-speed bus, since each module on its own may often not need the full bandwidth of an ATM link. This architecture also provides a migration path to ATM in private networks while utilizing existing LAN infrastructure.

The backplane bus switching architecture provides for switching of cells through a switch fabric that is designed to act upon information in the header area in order to provide routing of cells in the networks. The switch fabric is normally implemented in hardware, for example, using large-scale integrated circuits, in order to provide for high-speed switching of cells in the network.

Two primary tasks are generally accomplished by an ATM switch: (1) translation of VPI/VCI information, and (2) transport of ATM cells from an input port to an output port.

A switch is typically constructed of a plurality of switching elements which act together to transport a cell from the input of the switch to the correct output. Various types of switching elements are well known such as the aforementioned matrix switching elements and the backplane bus switching elements. Each is well known to those of ordinary skill in the art and each carry out the two above-mentioned tasks. Translation of the VPI/VCI information is important because in a standard ATM network the contents of these fields only have local meaning, i.e., the same data would be interpreted differently by each switch. Thus, the VPI/VCI information translated by each switch and changed prior to the cell being output from the switch. This translation is accomplished through the use of translation tables which are loaded into the switch fabric, generally under control of a switch controller.

The translation tables control the switch fabric to make routing decisions within the switch. The translation tables may be updated during operation of the switch in order to provide for new virtual paths/virtual circuits or to remove existing ones. This process may be referred to as call set-up and call tear-down. Thus, generally, in an ATM switch, a VPI/VCI is supplied in the cell header at the input of the switch and the VPI/VCI is translated by the switch fabric and the cell is routed to the appropriate output port. Generally, the network device generating the cell has no knowledge of the specific output port to which the switch will send the cell. Rather, this routing decision is made by the switch based on the then current translation tables.

As will be seen, the present invention provides for an ATM switch having VPI/VCIs and allows for the ATM switch to select an appropriate output path for an ATM cell to be transmitted to an ATM module and ATM network coupled thereto, as well as the ability to transfer cells across the backplane bus of the ATM switch from a port on one module to a port on another LAN module, without a VPI/VCI, i.e., a connectionless transfer of an ATM cell between LAN modules, across the ATM switch fabric.

ATM switches are well known in the art. A well-known embodiment of an ATM switch is the Speed Switch 100™, available from Bay Networks, Inc. of Santa Clara, Calif., the assignee of the present invention. The Speed Switch 100 is a backplane-based switching hub having an ATM core fabric at its backplane. The Speed Switch 100 allows up to 12 switching modules, each autonomous LAN or ATM switches, to be plugged into the Speed Switch. Modules with different types of LAN and ATM media interfaces can be plugged in to create a switched LAN backbone. The various modules may support, for example, ATM, Ethernet (or other CSMA/CD protocols), FDDI and Token Ring networks.

OBJECTS OF THE INVENTION

From the foregoing discussion, because of the central role the switch fabric in an ATM switch plays, it can be seen that it is desirable to increase the efficiency and predictability with which it operates in connection with providing bandwidth across the fabric for modules coupled thereto.

Thus, It is an object of the invention to dynamically allocate bandwidth on an ATM switch backplane bus to a particular module coupled thereto according the needs based on the type of module as determined by a programmable controller.

It is a further object of the invention to facilitate delivery of ATM cells across the backplane of an ATM switch through use of a routing tag.

It is yet another object of the present invention to facilitate utilization of the backplane through the use of pipelining.

SUMMARY OF THE DISCLOSURE

The present invention relates to methods and apparatus providing for a switching hub in which an asynchronous transfer mode (ATM) switch is utilized as a backplane bus.

Bus arbitration, i.e., allocation of bandwidth, on the bus for autonomous ATM and LAN switching modules coupled thereto is dynamically controlled according to the needs of the various modules. In particular, the present invention allows time division multiplexing of the bus under programmatic control such that each module, e.g., an Ethernet or Token Ring module, is allowed a desired number of cell slots on the bus during which to transfer data, which the module has translated into ATM cells, across the bus.

Each LAN or ATM module is an autonomous switching module. Thus, for example, and Ethernet LAN module may receive Ethernet packets on one of its ports and transmit the packets out another one of its ports according to well known standards and techniques for bridging such packets, without the need for such packets to be translated into ATM cells and transmitted across the ATM switch backplane bus. In the event an a source LAN or ATM module in the switching hub has data to transmit to a destination LAN or ATM module, the destination module is notified prior to transmission of ATM cells across the backplane to the destination module, thus allowing the destination module to schedule reception of the ATM cells off the backplane between its autonomous switching activities, thereby enhancing the utilization of the switching capacity of the autonomous module.

Likewise, a source LAN or ATM module is notified two cell slots prior to obtaining ownership of the backplane that, indeed, it will obtain ownership of the backplane bus, so that it may also more fully utilize its switching capacities by performing switching activities during the next two cell slots until such time as it is provided ownership of the backplane data bus and begins transmitting ATM cells to a destination module.

The switch fabric of the ATM switch, i.e., the ATM switch backplane bus, switches a cell based on routing information provided by the source LAN or ATM module to an output port on a destination LAN or ATM module of the switching hub. In the described system, the ATM switch is preconfigured to provide a fully connected topology between ports of all modules. In one embodiment, ATM cells transmitted across the ATM switch fabric between a source LAN or ATM module and a destination LAN module, e.g., Token Ring, FDDI or Ethernet, is accomplished by way of a routing tag prepended on the ATM cells. The routing tag provides both unicast and multicast group destination information such that the ATM cells are routed to the appropriate port on a given destination module without the need to establish, via a VPI/VCI pair, a virtual circuit between the source module and the destination module.

These and other aspects of the present invention will be discussed in greater detail with reference to the detailed description and the accompanying figures.

BRIEF DESCRIPTION OF THE DRAWINGS

The present invention is illustrated by way of example and not limitation in the following figures. Like references indicate similar elements, in which:

FIG. 5 is a timing diagram illustrating an embodiment of the present invention.

FIG. 6 is a diagram of an ATM cell format as utilized by an embodiment of the present invention.

FIG. 7 illustrates the pipeline architecture of an embodiment of the present invention.

FIG. 8 diagrams an implementation of an embodiment of the present invention for dynamically allocating bandwidth on the backplane bus of an ATM switch.

FIG. 9 illustrates the format of the routing tag (DTAG) as utilized by an embodiment of the present invention.

DETAILED DESCRIPTION OF THE EMBODIMENTS OF THE INVENTION

What is described herein is methods and apparatus utilizing an asynchronous transfer mode (ATM) switch as the switching fabric, i.e., the backplane bus, of a switching hub. In the following description, numerous specific details are set forth in order to provide a thorough understanding of the present invention. It will be apparent, however, to one of ordinary skill in the art that the present invention may be practiced without these specific details. In other instances, well-known circuits, structures, and techniques have not been shown in order not to unnecessarily obscure the present invention.

Overview of a Hub According to an Embodiment of the Present Invention

Figure 1A:
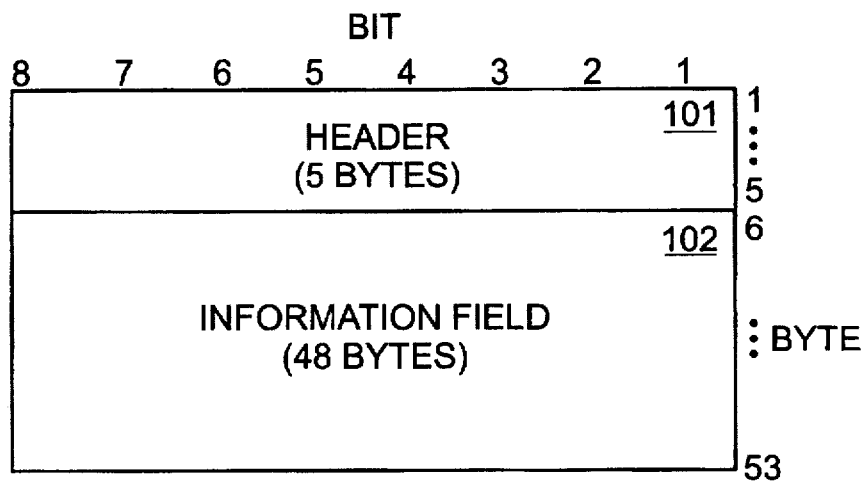
FIGS. 1(a), (b) and (c) are diagrams illustrating the format of an ATM cell as may be utilized in the present invention.
Figure 1B:
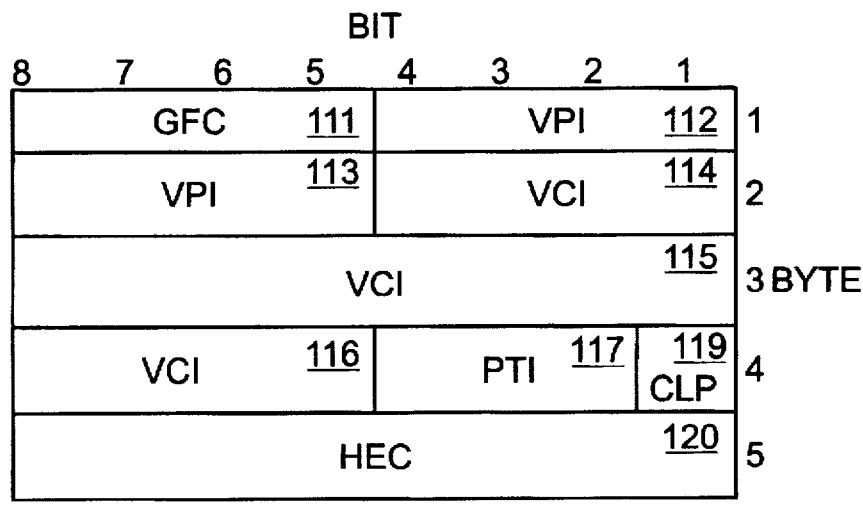
Figure 1C:
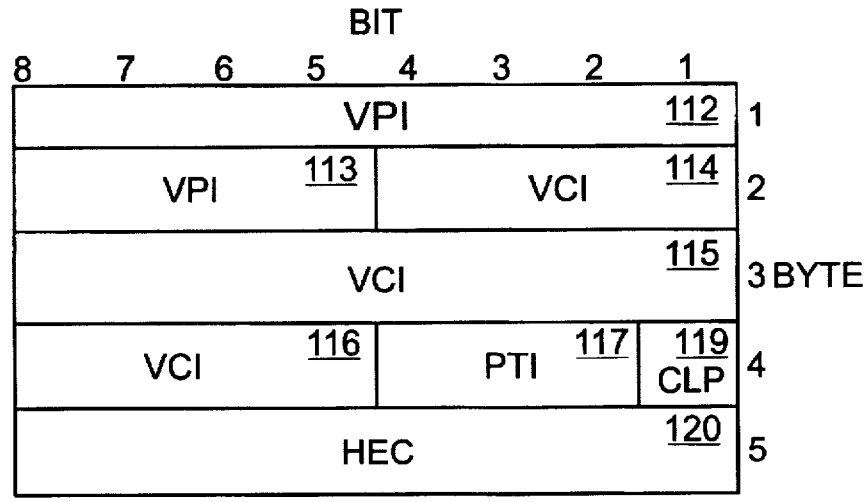
Figure 2:
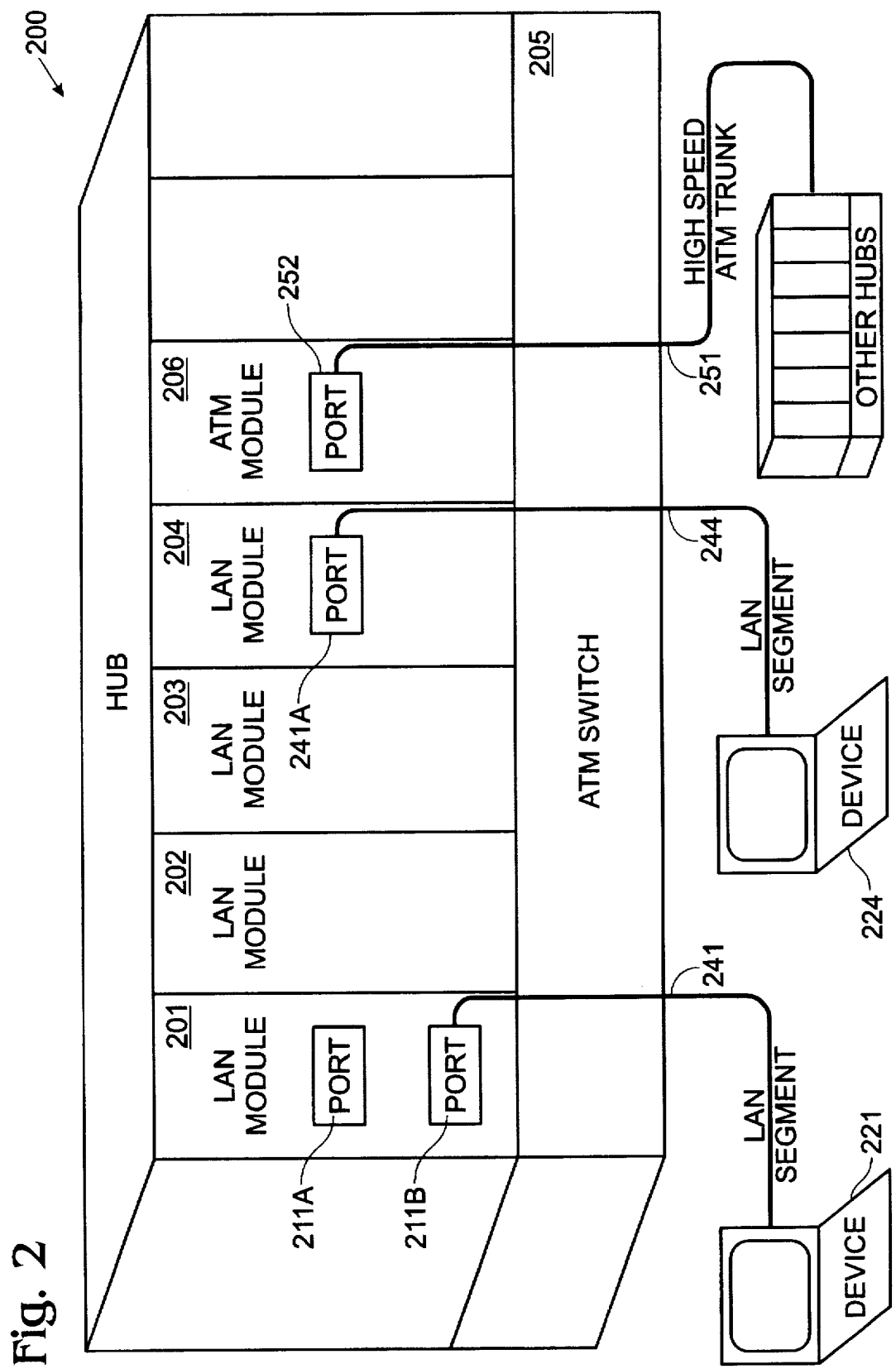
FIG. 2 is an illustration of a switching hub as may be utilized by the present invention.

Referring now to FIG. 2, a hub according to one embodiment of the present invention is described. It is noted that a typical hub 200 in one embodiment of the present invention comprises a total of 12 LAN and/or ATM modules each having between 2 and 16 ports each depending on the type of ATM or LAN module allowing connection of many types of local area network segments although for the sake of simplicity, in FIG. 2, for example, only 4 LAN modules 201–204 and one ATM module 206 are illustrated as being connected to ATM switch 205. Moreover, only two ports 211A and 211B are illustrated on LAN module 201. However, it will be apparent to one of ordinary skill in the art that the total number of ports supported by a switch may vary from implementation to implementation and such variance should not be considered a departure from the present invention.

A network hub 200 is shown which comprises four LAN modules 201–204, in which module 201 is illustrated as having a plurality of ports such as, for example, ports 211A and 211B. Each of the modules is capable of supporting a plurality of ports according to the type of LAN module. Each of the ports is capable of supporting a LAN segment such as LAN segment 241 to which a network device 221 is attached.

In addition, a hub according to an embodiment of the present invention provides an ATM switch 205 in the hub 200. The hub 200 further may provide one or more ports 252 on ATM module 206 for connecting ATM switch 205 to other hubs over a high speed ATM trunk such as trunk 251 in order to make up a larger network. In addition to allowing a larger network, this technique allows for native ATM hosts, e.g., servers, to be connected to the network. It should be noted that LAN modules 201–204 communicate with each other by way of the ATM switch 205.

It is noted that certain local area network technologies operate at what will be termed herein relatively low speeds (e.g., Ethernet at 10 Mb/s, token ring at 16 Mb/s) and provide for sharing the available bandwidth between the various devices attached to the network. Other known local area network technologies operate at other speeds (e.g., FDDI at 100 Mb/s) but still provide for sharing of the available bandwidth. An ATM switch operates at what will be termed herein relatively higher speeds, currently on the order of 155 Mb/s, and the full bandwidth of the switch is generally thought of as being available to all devices attached to the network.

Generally, the present invention works by a device such as network device 221 transmitting a packet over its LAN segment 241 to port 211A of module 201. Assume that the packet is addressed to device 224. LAN module 201 will then forward the packet to port 241A of hub 200. Either the ATM switch module 205 or the LAN module 204 comprises a module that acts to segment the packet into a plurality of ATM cells, each a fixed length of 48 bytes. In addition, the module provides the proper routing information in each cell header as will be seen below according to an embodiment of the present invention.

As the packet is segmented, the cells are transmitted to the ATM switch 205 where the cells are routed to an output port associated with the module to which the destination network device is attached, e.g., the cells are routed to module 204, port 241A to which network device 224 is attached. The cell is then switched to a buffer in module 204 where it is reassembled, along with the other cells from the packet which have been similarly created by the segmentation process and transmitted over the switch, to again form the packet before the packet is transmitted out port 204 to destination device 224 over LAN segment 244.

Figure 3:
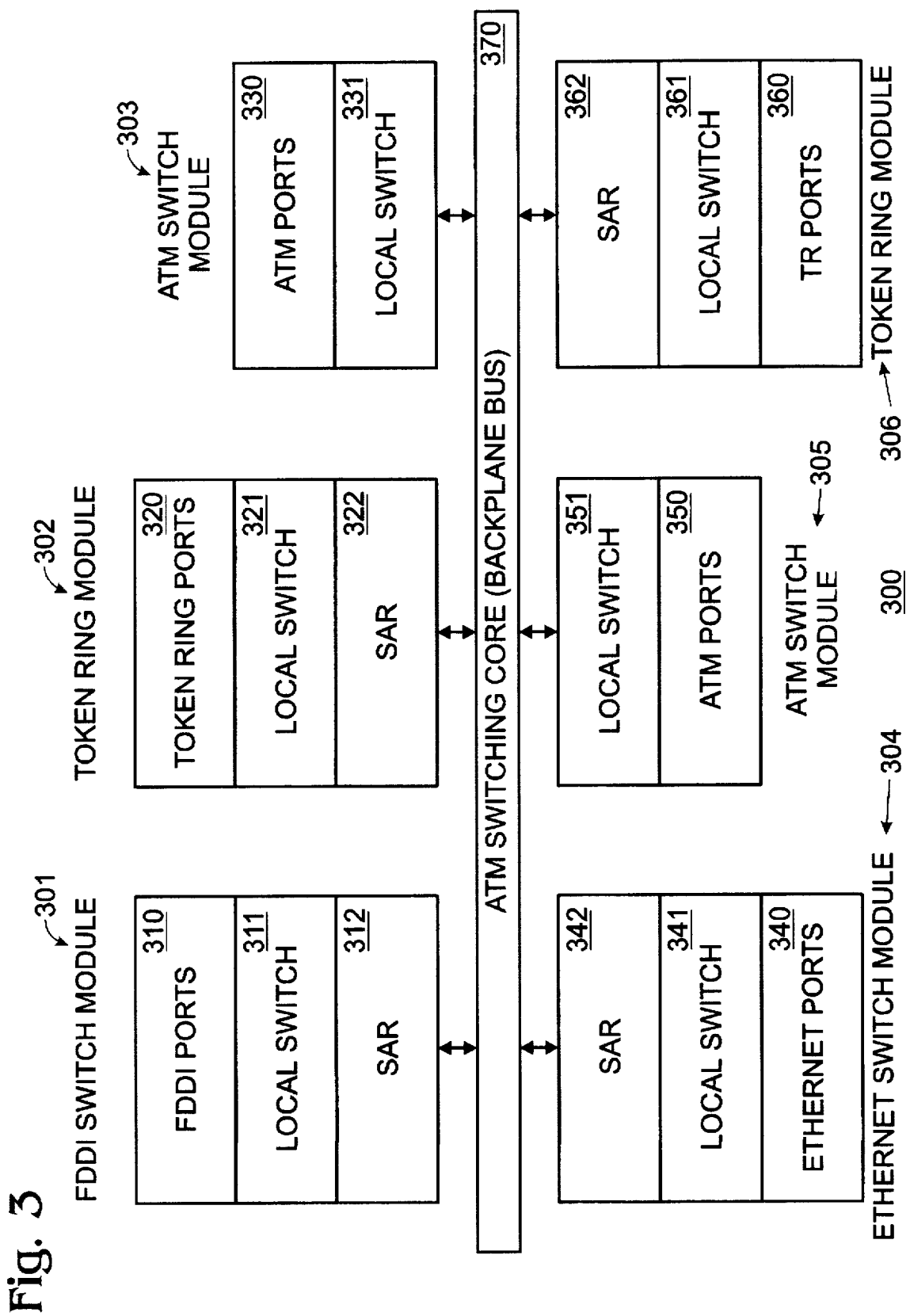
FIG. 3 is an illustration of a switching hub as may be utilized by the present invention.

FIG. 3 illustrates an alternative preferred embodiment according to the present invention, wherein each module is, in itself, a local switch. Thus, for example, Ethernet switching module 304 has a local switch 341 to which a plurality of Ethernet ports 340 are coupled. Traffic entering one of Ethernet ports 340 destined for another one of Ethernet ports 340 is switched locally within Ethernet switch module 304 by local switch 341 without using any of the ATM core 370 bandwidth. This frees the ATM core for only cross-module traffic.

An ATM segmentation and reassembly (SAR) module on each LAN switch module converts packets into ATM cell streams for transport over the ATM core fabric. For example, assume a packet entering one of token ring ports 320 on token ring module 302 is destined for a network device coupled to one of token ring ports 360 of token ring module 306. The packet is segmented into ATM cells by SAR 322 and transported over the ATM backplane bus 370 to SAR 362, wherein the cells are reassembled before being transmitted out one of token ring ports 360.

Note additionally that ATM switch modules 303 and 305 can likewise switch ATM cells received on one of ATM ports 330 and 350 locally by way of local switches 331 and 351, respectively, without using any ATM backplane bus 370 bandwidth. Moreover, SAR modules are absent from ATM switch modules 303 and 305 as the traffic received and transmitted on the ATM modules are received as and remain ATM cells.

As is well known in the art, and as described in further detail, for example, with reference to U.S. Pat. No. 5,408,469, assigned to the assignee of the present invention, LAN modules such as LAN module 201 of FIG. 2 or Ethernet switch module 304, FDDI switch module 301, and token ring module 302 of FIG. 3, generally provide for at least the following four functions in accordance with an embodiment of the present invention:

(1) Address learning and propagation. This involves latching, i.e., storing a source address, e.g., a media access control (MAC) address, and propagating the association of MAC address and the module number and port number over which the source address may be reached;

(2) Address Look-up

This involves determining the VPI/VCI to use so that a packet is transmitted from hub 200 on the correct outgoing port of an ATM module, or as will be seen in the present invention, the routing tag and reassembly identifier to use so that a packet will be sent to the correct outgoing port of a LAN module;

(3) Multiplexing and Demultiplexing

This involves combining ATM cells sourced from multiple ports into a single cell stream on a per module basis before such cells are transmitted over the switching fabric, and distributing the ATM cells arriving at a module from over the switch fabric to the correct port on a module based on either VPI/VCI or routing tag and reassembly identifier information; and, (4) Segmentation/Reassembly This involves segmenting LAN packets that may be of some variable length, e.g., Ethernet packets, into relatively small and fixed length ATM cells before transmission to the ATM switch and reassembling the ATM cells into LAN packets at the receiving LAN module.

EMBODIMENT OF THE PRESENT INVENTION

Introduction

The methods and apparatus of the present invention are disclosed in the following detailed discussion with reference to the backplane bus, e.g., backplane bus 370 of the present invention, wherein the bus allows for efficient transport of ATM cells based on LAN and ATM module bandwidth capabilities, cell priority, and fairness with guaranteed delivery.

Pipelined Architecture of ATM Switch Backplane Bus

As mentioned above, each LAN module or ATM module as illustrated in the embodiment of a switching hub 300 disclosed in FIG. 3 is an autonomous switching module. Thus, for example, and Ethernet LAN switching module 304 may receive Ethernet packets on one of its ports 340 and transmit the packets out another one of its ports 340 according to well known standards and techniques for bridging such packets, without the need for such packets to be translated into ATM cells and transmitted across the ATM switch backplane bus 370. In the event a source LAN or ATM switching module in the switching hub 300 of FIG. 3 has data to transmit to a destination LAN or ATM module, the destination module is notified prior to transmission of ATM cells across the backplane 370 to the destination module, thus allowing the destination module to schedule reception of the ATM cells from the backplane between its autonomous switching activities, thereby enhancing the utilization of the switching capacity of the autonomous module, (including memory utilization of buffers used to store and forward packets transmitted by the destination module onto the attached local area network).

Likewise, a source LAN or ATM module is notified two cell slots prior to obtaining ownership of the backplane 370 that, indeed, it will obtain ownership of the backplane bus, so that it may also more fully utilize its switching capacities by performing switching activities of the autonomous module, (including memory utilization of buffers used to store and forward packets received by the module from the attached local area network), during the next two cell slots until such time as it is provided ownership of the backplane data bus and begins transmitting ATM cells to a destination module. (The method and apparatus of the present invention for allocating which LAN or ATM module is to transmit a cell on the bus is discussed below under the heading Dynamic Allocation of ATM Switch Backplane Bus).

Figure 4:
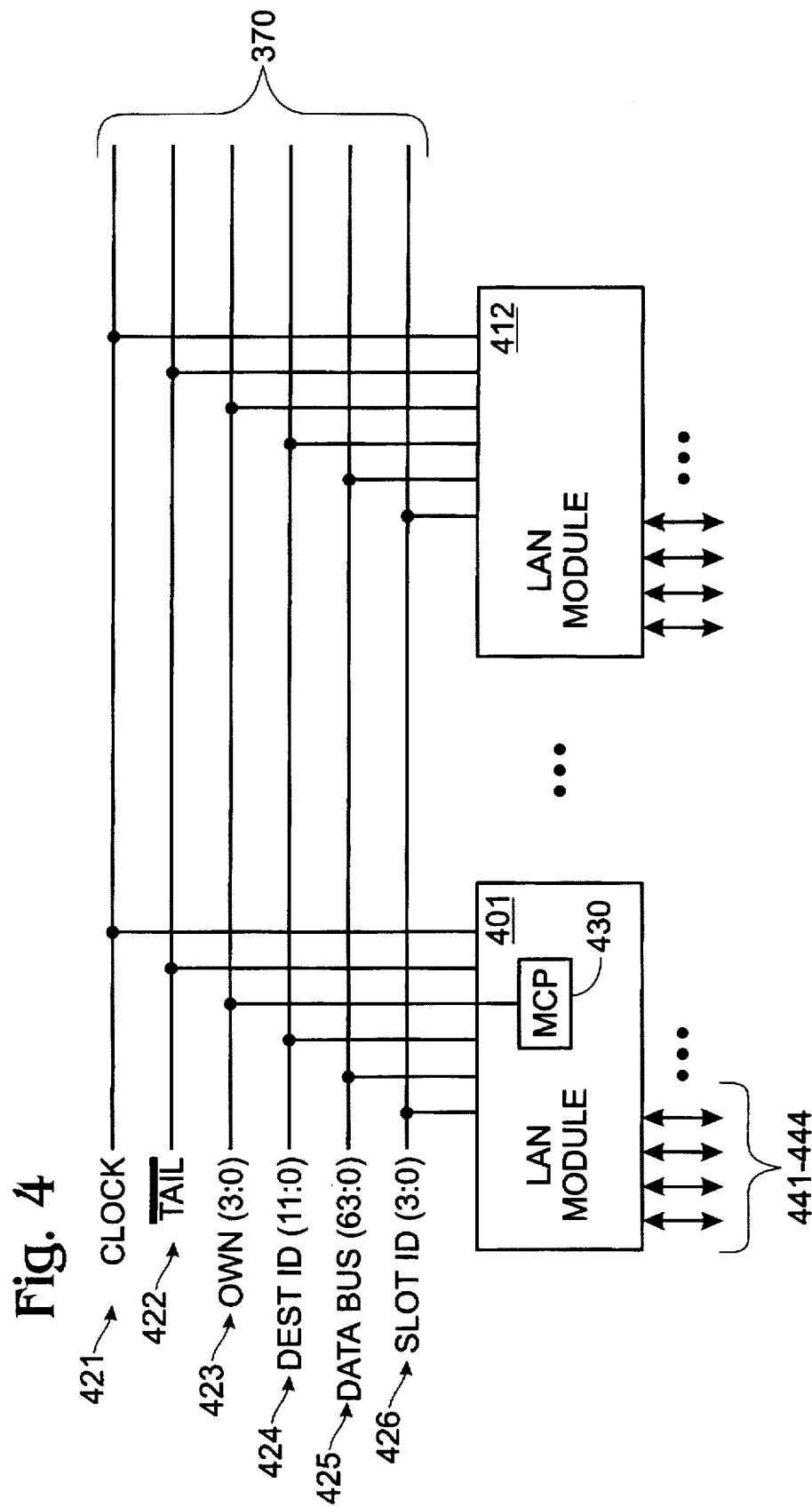
FIG. 4 is a diagram of the component buses comprising the switching fabric backplane bus in an embodiment of the present invention.

With reference to FIG. 4, the backplane bus 370 of the present invention is further comprised of a 64-bit parallel bidirectional data bus 425, a 4-bit ownership bus 423 (OWN(3:0)), a tail signal line 422, a destination identification bus 424 (DEST ID(11:0)), a hardwired slot identification bus 426 and a clock signal line 421. Further with reference to FIG. 4, for example, are LAN switching modules 401 through 412, each with a number of ports, for example, ports 441-444 on LAN switching module 401. It should be noted that with reference to the 4-bit ownership bus and 12 bit destination bus, the bus widths may vary to accommodate greater or fewer modules as defined by the size of the switching hub.

With reference to FIG. 5, a timing diagram illustrating timing characteristics for the signals transmitted over the buses disclosed in FIG. 4 is shown. All signals are transmitted and sampled on the rising edge of clock signal 421. Seven contiguous clock cycles represent a single cell slot, each cycle of which allows the transfer of 64 bits. Thus, a 56-byte cell can be transferred by the backplane interface, for example, LAN module 401, during a single cell slot. The format of the 56-byte cell is illustrated with reference to FIG. 6. The seven cycles of a cell slot, cycles 0-6, are shown at 622. The first 64 bits of a cell are transmitted during cell slot cycle 0 (at 620), while the information payload, i.e., the 48 bytes of an AAL-5 information payload passed down to the ATM layer (384 bits), is transmitted during cell slot cycles 1-6 (at 621). (A detailed discussion of the format of the ATM cell header as illustrated in FIG. 6 may be found below in connection with the discussion of the routing tag and reassembly identifier).

A discussion of the switch fabric's operation of the data bus 425, destination identification bus 424 and ownership bus 423 with respect to clock signal 421 follows. A cell slot is defined by the signal on TAIL 422 going active low, as shown in FIG. 5. An active low signal on TAIL 422 indicates the last of seven clock cycles on line 421 for each cell slot on the data bus 425. It is further used to identify cell boundaries.

With reference to FIGS. 5 and 7, at the second cycle of cell slot 0 and following the rising edge of the signal on TAIL 422, a module identification number identifying a hardwired slot number of a source module that will own the data bus 425 two cell slots forward is transmitted on ownership bus 423 (OWN(3:)). An ATM or LAN module, e.g., LAN module 401, compares the hexadecimal value encoded on ownership bus 423 with its unique hardwired slot identification number as determined by the slot in the cabinet of the switching hub in which the ATM or LAN module is plugged. If the LAN module's unique hardwired slot id matches the value present on ownership bus 423 during the current cell slot, and the ATM or LAN module has ATM cells queued for transmission across the backplane bus, the LAN module schedules transmission of an ATM cell at the head of the queue for a point in time two cell slots forward. This allows a minimum of two cell slots for the source ATM or LAN module to prepare for transmission of the cell on data bus 425.

At the second cycle of the next cell slot, i.e., cell slot 1, a destination identification number is transmitted on the destination identification bus 424 identifying one or more destination ATM or LAN modules that are to receive the cell transmitted by the ATM or LAN module identified on ownership bus 423 the previous cell slot. The destination identification number is a bit per card identifying which modules are to receive a cell the next cell slot. If the LAN module's bit in the dest id lines is set, it will receive the cell from the data bus starting coincident with the TAIL signal for the next cell slot. This allows a minimum of one cell slot for the destination module(s) to prepare for receipt of a cell on data bus 425.

Finally, at cell slot 2, the ATM or LAN module identified on the ownership bus 423 during cell slot 0 transmits a cell on data bus 425 to the ATM or LAN module identified on the destination identification bus 424 during cell slot 1, and the ATM or LAN module or modules identified on the destination identification bus 424 during cell slot 1 receives the cell so transmitted. The operation of the three buses in relation to the clock signal is such that during any given cell slot, three things are occurring simultaneously, as shown in FIG. 5: (1) a module identification number is driven on ownership bus 423 identifying an ATM or LAN module that will own the data bus 425 two cell slots hence; (2) a destination identification number is driven onto destination identification bus 424 identifying one or more ATM or LAN modules that will receive a cell during the next cell slot; and, (3) an ATM or LAN module that was identified two cell slots prior that it would own the data bus 425 is transmitting a cell on data bus 425.

Dynamic Allocation of ATM Switch Backplane Bus Bandwidth

With reference to FIG. 3, bus arbitration, i.e., allocation of bandwidth, on backplane bus 370 for autonomous ATM and LAN switching modules coupled thereto is dynamically controlled according to the needs of the various modules. In particular, the present invention allows time division multiplexing of the bus under programmatic control such that each module, e.g., an Ethernet or Token Ring module, is allowed a desired number of cell slots on the bus during which to transfer data (ATM cells) across the bus.

As discussed above, FIG. 4 illustrates one embodiment of a switching hub in which an asynchronous transfer mode (ATM) switch is utilized as a backplane bus. The backplane bus 370 of the present invention further comprises a 64 bit parallel bidirectional data bus 425, a 4-bit ownership bus 423, TAIL line 422, and a global clock 421. Arbitration on the data bus 425 is controlled by a master control processor (MCP) 430, resident on a LAN module 401, as illustrated in FIG. 4. (It should be noted that MCP 430 may reside on any LAN or ATM module or on a separate non-ATM or LAN module coupled to the switch fabric without having any affect on the functionality of the device as it relates to the present invention).

MCP 430 is illustrated in greater detail with reference to FIG. 8. MCP 430 comprises a memory array, for example, in one embodiment, a static random access memory (SRAM) array 802 having 2048 entries, a controller such as erasable programmable logic device (EPLD) 804, comprised of a CPU interface 800 and an address generator 801. The CPU interface 800 is coupled to memory array 802 via the ownership bus, shown in FIG. 8 as bus 814. Latch 803 allows CPU interface 800 to write to memory array 802 during operation of the switching hub without disturbing the current state of the ownership bus 814 as sensed by the ATM and LAN modules of the switching hub.

Address generator 801 receives as input the global clock signal and the TAIL signal, shown in FIG. 8 as lines 811 and 810, respectively. Address generator 801 is used to index memory array 802. This is done in a circular manner, wherein EPLD first reads and outputs on to ownership bus 814 the value in the first entry of memory array 802, then the second entry, etc., until it reaches the last entry, entry 2048, at which point the adress generator 801 goes back to the first entry of memory array 802.

The address generator reads memory array 802 and drives the value in the current entry on to ownership bus 814 at the beginning of every cell slot, as governed by the TAIL signal input 810 to address generator 801. Every seven clock cycles, TAIL is driven active low by a divide by seven circuit, indicating the end of the last clock cycle of the cell slot. Every time EPLD sees TAIL go active low, it increments a counter which advances the address pointer output on address line 812. In this way, address generator 801 walks sequentially through memory array 802, one entry every cell slot. Thus, in one embodiment of the present invention where memory array 802 has 2048 entries and total bandwidth on data bus 425 is 3.2 Gb/s, bandwidth can be dynamically allocated in 1.56 Mb/s increments.

While the present invention contemplates allocating bandwidth dynamically on a per module basis, such allocation could conceivably be accomplished on a per port basis, if each port were provided with a separate queue rather than multiplexing all cells from all ports on a given module into the same queue prior to transport over the switch fabric.

The values in the entries of memory array 802 indicate module identification numbers. Thus, every cell slot EPLD drives a module identification number on to ownership bus 814 to indicate which module will own the data bus two slots hence, thus controlling allocation of cell slots on the data bus 425 as between the ATM and LAN modules in the switching hub. CPU interface 800 is under programmatic control to write the module identification numbers in to memory array 802 upon power up and further to update memory array 802 during operation of the switching hub in accordance with an algorithm that is based on ATM and LAN module requirements, needs, application priorities, total bandwidth requirements and fairness considerations.

Thus, cell slots are distributed and assigned to each ATM and LAN module in accordance with and under the dynamic control of MCP 430, rather than all cards fighting for a given slot based on some fixed arbitration scheme. This allows the MCP to program bandwidth to each module based on its traffic needs.

Routing Tag and Reassembly Identification

The switch fabric of the ATM switch, i.e., the ATM switch backplane bus, switches a cell based on routing information provided by the source LAN or ATM module to an output port on a destination LAN or ATM module of the switching hub. In the described system, the ATM switch is preconfigured to provide a fully connected topology between ports of all modules. In one embodiment, ATM cells transmitted across the ATM switch fabric between a source LAN or ATM module and a destination LAN module, e.g., Token Ring, FDDI or Ethernet, is accomplished by way of a routing tag prepended on the ATM cells. The routing tag provides both unicast and multicast group destination information such that the ATM cells are routed to the appropriate port on a given destination module without the need to establish a virtual circuit between the source module and the destination module using VPI/VCIs.

With reference to FIG. 6, a 4-byte header 601 comprising a cell priority field 603, a reserved field 604, a reassembly identifier (RID) 605 and a routing tag (destination tag—DTAG) 606 may be prepended to an ATM cell as illustrated therein. The fields, in combination with the standard 5-byte ATM cell header 602 (less the HEC) comprise a total of 8 bytes of information used by LAN modules in the switching hub of the present invention to perform switching and routing decisions. The first clock cycle of each cell slot carries the 64 bits of overhead to allow for correct cell transfer across the backplane. The table below gives a description of each field, and how it is used. It should be noted that the meaning of each field is from the perspective of the backplane—each type of LAN or ATM module may use the fields for other purposes local to the module.

| Bits | Field | Length | Description |
| --- | --- | --- | --- |
| 63 | CP | 1 | Cell Priority. Indicates the priority of the cell. 0 is low priority, 1 is high priority. Priorities are set on a per VC basis. Configured by S/W during call set up. |
| 62-57 | Reserved | 7 | Reserved for Future use |
| 56-45 | RID | 12 | Reassembly identifier for the cell. For LAN modules, this ID is used to maintain different reassembly contexts within the SAR. It can also be viewed as a source identifier. For ATM modules, this ID is used as a key for the table lookup performed during output header translation. Configured by S/W during call set up. |
| 43-32 | DTAG | 12 | Destination Tag for the cell. This tag is used to uniquely identify a cell as belonging to a specific connection. The first 256 tags (0-FF hex) identify unicast cells as module and port number. Values above 256 identify multicast groups. Configured by S/W during call set up. |
| 31-28 | GFC | 4 | Generic Flow Control. Currently not used. |
| 27-20 | VPI | 8 | Virtual Path Identifier. Translated ATM standard VPI for ATM calls. Configured by S/W during call set up. |
| 19-4 | VCI | 15 | Virtual Circuit Identifier. Translated by ATM standard VCI for calls involving ATM modules. Configured by S/W during call set up. |
| 3-1 | PTI | 3 | Payload Type Indicator. Indicates whether the cell contains user or network management related information. |
| 0 | CLP | 1 | Cell loss priority. If the value of the field is 1, the cell is subject to discard during congestion |

In the switching hub of the present invention as illustrated in FIG. 3, traffic can be routed either LAN to LAN, LAN to ATM, ATM to LAN, or ATM to ATM. Furthermore, with respect to LAN to LAN and ATM to ATM, traffic may either be routed within a module or between modules, depending on the destination of the traffic. It is only in the case of cross module traffic transported across the ATM switch fabric that the RID and DTAG are used. When a packet is received at, for example, one of Ethernet ports 340 and transmitted out one of Ethernet ports 340, the packet does not traverse the switch fabric (backplane bus 370). Thus, RID 605 and DTAG 606 are not prepended as the packet is not routed through the ATM switch.

However, when a packet is received on, for example, one of Ethernet ports 340 of Ethernet switching module 304 and the destination MAC address points to a network device coupled to another port on another Ethernet module (not shown in FIG. 3), as determined from the translation tables in local switch 341, the packet is transferred to SAR 342 wherein it is segmented into ATM cells. Each cell comprising the packet is prepended with a reassembly identifier (RID) 605 and a DTAG 606, prior to transmission across the backplane bus 370. The DTAG specifies the destination LAN module and port number to which the cell is to be transmitted, while the RID is used by the SAR module in the receiving LAN module to reassemble cells having the same RID in order to transfer the entire packet to the appropriate port therein. Such a RID is useful when a receiving LAN module receives cells concurrently from multiple circuits. Without the RID to identify which cells should be reassembled into a packet, data corruption is likely to occur.

The concept of a routing tag (DTAG) 606 is well known to those of ordinary skill in the art. However, such routing information is generally a single value whose range depends simply on the length of the routing tag field. The present invention subdivides the DTAG 606 into two components as illustrated in FIG. 9, wherein the lower 8 bits of the DTAG comprise a destination port number 903 (low order nibble—bits 0–3) and a destination module number 902 (high order nibble), and the uppermost nibble specifies a multicast group number 901, such that any DTAG value between 0 to 255 (FF hex) is a unicast number 904 that uniquely identifies a particular port on a particular LAN module, allowing unicast cells to be switched in a connectionless fashion, and any DTAG value between 256 (100 hex) to 4095 (111 hex) is a multicast group number that identifies a group of ports on any number of LAN modules. A multicast group number mask in each LAN module is configured to recognize a particular multicast group number, and thus, receive cells in which the multicast group number is used.

Conclusion

There are, of course, alternatives to the described embodiment which are within the understanding of one of ordinary skill in the relevant art. The present invention is intended to be limited only by the claims presented below.

Thus, what has been described is a method and apparatus which utilizes an ATM switch backplane bus for interconnecting LAN and ATM modules in which the ATM switch allocates bandwidth to the switching modules using a dynamically computed algorithm that is based on application priorities, total bandwidth requirements, and fairness, and in which a pipelining mechanism enhances utilization of the autonomous switching modules as well as bandwidth on the backplane, and in which routing of ATM cells between modules is accomplished under certain conditions without establishing a permanent virtual circuit between the modules.

What is claimed is:

1. An apparatus for dynamically allocating bandwidth on a time division multiplexed (TDM) bus among a plurality of modules coupled thereto, comprising:

a memory array having a plurality of entries, each entry for storing therein a module identification number identifying one of said plurality of modules;

a controller coupled to said memory array, said controller writing said module identification number identifying one of said plurality of modules to at least one of said plurality of entries in said memory array in accordance with an algorithm executed by said controller to dynamically select said module identification number written to each of said plurality of entries, and said controller sequentially reading said plurality of entries in said memory array, said controller reading said module identification number from one of said plurality of entries each time division and allocating bandwidth on said TDM bus to said module identified by said module identification number read from said one of said plurality of entries.

2. An apparatus for dynamically allocating bandwidth on a time division multiplexed (TDM) bus to a module coupled thereto, comprising:

a memory array having a plurality of entries, each for storing therein a module identification number identifying one a plurality of modules;

a controller coupled to said memory array, said controller writing said module identification number identifying one of said plurality of modules to at least one of said plurality of entries in said memory array in response to an algorithm executed by said controller for dynamically selecting said module identification number written to each of said plurality of entries; and said controller sequentially reading said module identification number from one of said plurality of entries each time division and allocating one time division on said TDM bus to said module if said module identification number read from said one of said plurality of entries identifies said module.

3. An apparatus for dynamically allocating a slot of time on a time division multiplexed (TDM) bus to a module coupled thereto, comprising:

an ownership bus coupled to said module for transmitting a module identification number identifying one of a plurality of modules to said module;

a memory array coupled to said ownership bus, said memory array having multiple entries, each said entry capable of storing therein said module identification number identifying one of said plurality of modules; and a controller coupled to said memory array, said controller executing a program for dynamically updating at least one of said multiple entries with said module identification number identifying said module, said controller reading a module identification number from one of said multiple entries each said slot of time and transmitting said module identification number over said ownership bus, thereby notifying said module that it has been allocated said slot of time on said TDM bus if said module identification number transferred on said ownership bus identifies said module.

4. A method of dynamically allocating bandwidth on a time division multiplexed (TDM) bus among a plurality of modules coupled thereto, comprising the steps of:

dynamically writing one of a plurality of values to at least one of a plurality of entries in a memory array, said plurality of values each indicating a module identification number identifying one of said plurality of modules;

sequentially reading through said plurality of entries in said memory array, one entry each time division;

driving said value onto an ownership bus coupled to said plurality of modules;

comparing at each said module said value on said ownership bus to said module identification number identifying said module; and allocating said bandwidth on said TDM bus to said module if said value on said ownership bus is identical to said module identification number identifying said module.

5. A method for controlling allocation of a time slot on a time division multiplexed bus to one of a plurality of modules coupled thereto, comprising the steps of:

dynamically writing one of a plurality of values to each one of a plurality of entries in a memory array, each value indicating a module identification number identifying one of said plurality of modules;

reading one of the plurality of entries in the memory array each time slot;

transmitting said value read from said one of said plurality of entries each said time slot to said plurality of modules each said time slot; and allocating said time slot on said bus to a selected one of said plurality of modules on the basis of said value indicating the module identification number of said selected module.

* * * * *